US005445479A

United States Patent [19]

Hillinger

[11] Patent Number: 5,445,479

[45] Date of Patent: Aug. 29, 1995

[54] ERGONOMICALLY DESIGNED, ELECTRICALLY ENERGIZED HAND DRILL HAVING A HOUSING, LONGITUDINALLY ALIGNED WITH A HAND, WRIST AND FOREARM SUPPORT

[76] Inventor: George Hillinger, 129 N. LeDoux Rd., Beverly Hills, Calif. 90211

[21] Appl. No.: 292,425

[22] Filed: Aug. 17, 1994

[51] Int. Cl.[6] .......... B23B 45/00

[52] U.S. Cl. .......... 408/16; 30/296.1; 16/115; 408/124; 408/241 R

[58] Field of Search .......... D8/61, 68, 69, 70, 107, D8/30; 16/115; 248/118; 30/296.1, 298; 408/16, 124, 241 R, 710; 310/47, 50; 81/177.1, 180.1

[56] References Cited

U.S. PATENT DOCUMENTS

| | | | |
|---|---|---|---|
| D. 326,597 | 6/1992 | Lee | D8/68 |
| 712,843 | 11/1902 | Paul | 173/168 |
| 2,504,880 | 4/1950 | Rittenhouse | 408/124 |
| 4,924,571 | 5/1990 | Albertson | 30/298 |
| 5,070,576 | 12/1991 | Banta | 16/126 |
| 5,313,735 | 5/1994 | Latouche | 43/23 |
| 5,361,851 | 11/1994 | Fox | 30/296.1 |

FOREIGN PATENT DOCUMENTS

| | | | |
|---|---|---|---|
| 56313 | 5/1981 | Japan | 408/241 R |
| 900747 | 7/1962 | United Kingdom | 408/241 R |

*Primary Examiner*—Daniel W. Howell
*Attorney, Agent, or Firm*—Albert O. Cota

[57] ABSTRACT

An electrically energized hand drill (10) that incorporates a hand, wrist and forearm support (50). The drill (10) is ergonomically designed, in combination with the support (50), to reduce incidents of repetitive-use injuries and cumulative-effect traumas. The drill design includes a housing (12) having on its rear side (12B) an upper and lower handle support (30, 32) that support a substantially vertical handle (34). The handle has a trigger switch (35) that when depressed by the middle finger, a battery power-pack housing (38), located above the upper handle support, supplies power to an internal electrical circuit (14) that distributes the power to operate the drill (10). Located on the housing's lower section rear side (12B) is the hand, wrist and forearm support (50). When the support (50) is placed in an extended, functional position, the support allows the wrist and forearm to be supported in substantial alignment with the longitudinal axis of the hand, which is in substantial alignment with the longitudinal axis of the drill bit (80).

22 Claims, 7 Drawing Sheets

ERGONOMICALLY DESIGNED, ELECTRICALLY ENERGIZED HAND DRILL HAVING A HOUSING, LONGITUDINALLY ALIGNED WITH A HAND, WRIST AND FOREARM SUPPORT

TECHNICAL FIELD

The invention pertains to the general field of electrically operated hand tools and more particularly to an ergonomically designed, electrically operated hand drill and the like that incorporates a housing that is longitudinally aligned with a hand, wrist and forearm support.

BACKGROUND ART

Recent scientific studies have proven that many hand tools and other similar devices may be much more damaging to the users than what is commonly attributed to injuries from accidents and/or improper use. The injuries referred to are not necessarily the fault of the user at all; but rather, the improper design of some tools and devices that lead to cumulative-effect traumas such as carpal tunnel syndrome, tenosynovitis, "Trigger Finger", inschemia, vibration-induced white finger and tennis elbow. These injuries commonly result from work requiring repetitive use of certain non-ergonomically designed tools over extended periods of time. The only way to reduce the occurrences of these types of injuries are for users to not use the injury producing tools as frequency and use only an ergonomically-correct type of tool that takes into consideration the effects of repetitive use. A reduction in frequency of use is not a viable option for the many individuals whose work relies on such use, therefore the only real solution is to develop better designed hand-operated tools.

As discussed above, the cumulative-effect traumas are the principle injuries caused from the improper design of tools. Tools that are particularly culpable are the hand-operated type of power tools, such as drills, saws, sanders and the like. These tools, because of the unbalanced design of their housings, handles and/or grips, do not compensate for the minimal or often, complete lack of support alloted the hand, wrist or forearm of the user. This lack of support does not allow for the tool to be held in a safe manner commensurate with extended duration. Because of the weight and the trepidations that occur during use of the tool, the hand will naturally bend at the wrist due to the absence of sufficient strength in the wrist and the forearm muscles which are used to support the tool's weight. After prolonged use this can lead to a number of potential work injuries. In order to properly understand the potential injuries and their causes, a rudimentary explanation is necessary of the relationships of the hand, wrist and forearm structures and their single and combined efforts which are applied during hand tool use.

The hand 90, fingers 90A, writs 90B and the forearm 90C is a complex structure comprised of bones 90D, arteries 90E, nerves 90F, ligaments 90G, and tendons 90H, as shown in FIG. 17. The fingers 90A are flexed by muscles in the forearm 90C. The muscles are connected to the fingers 90A by tendons 90H, which pass through a channel in the wrist. This channel is formed by the bones of the back of the hand on one side and the traverse carpal ligament 90G (flexor retinaculum) on the other. The resulting channel is called the carpal tunnel. Through this tunnel pass many vulnerable anatomic structures including the radial artery 90E and median nerve 90F. Running along the outside of the transverse carpal ligament 90G are the ulnar artery 90E and ulnar nerve 90F. This artery and nerve pass beside a small bone in the wrist called the pisiform bone 90D. The bones of the wrist connect to the two long bones of the forearm 90C—the ulna and the radius. The radium connects to the "thumb side" of the wrist and the ulna connects the "little finger side" of the wrist. The configuration of the wrist joint permits a neutral position 90I and movements in only two planes, each one at an approximate 90° angle to the other as shown in FIG. 18. The first plane allows palmar flexion 90J or, when it is performed in the opposite direction, dorsiflexion 90K. The second movement plane consists of either ulnar deviation 90L or radial deviation 90M of the hand 90. The ulna and radius of the forearm connect to the humerus of the upper forearm and the bicep muscle connects to the radius. When the forearm 90C is extended, the bicep muscle will pull the radius strongly against the humerus. This can cause friction and heat in the joint. The bicep muscle is both a flexor of the forearm and an outward rotator of the wrist. Whenever the forearm 90C is bent at 90° at the elbow and the wrist 90B is rotated outward, the bicep muscle contracts and bulges. This action, necessitates sufficient support to maintain a hand operated tool at a constant level. Also, simultaneous inward rotation of the hand, to direct the motion of the tool, are predominantly required in any hand tool use or application. However, when considering the damaging effects this repetitive motion produces, it should be considered in the design of the hand tool.

The flexor tendons of the fingers pass through the carpal tunnel of the wrist. When the wrist is aligned with the forearm, there is little change of injury. However, if the wrist is bent, especially in palmar flexion 90J or ulnar deviation 90L (or both) as shown in FIG. 18, problems can occur. The continued us of tendons that bend and bunch-up in the carpal tunnel, will cause tenosynovitis—an inflammation of the tendons and their sheaths.

Another form of tenosynovitis, known as "Trigger Finger", can develop if the index finger is used excessively for operating triggers switches when there is undue stress being exerted on other areas of the hand 90, wrist 90B or forearm 90C. The strength that would normally be directed to the index finger deviates to compensate for its necessity in the other areas. "Trigger Finger" is characterized by the afflicted person being able to flex but not extend the finger actively. The finger must be passively straightened, and when it is an audible click may be heard. This is caused by the distal phalanx (segment) of the finger having to be flexed while the middle phalanx is kept straight. One way to minimize this injury is to use the thumb or middle finger instead of the index finger to operate the trigger switch. The thumb is the only finger that is flexed, abducted and opposed by strong, short muscle located entirely within the palm of the hand as stated above. This would be a good way to avoid injury but for most hand tools operations, it is not considered feasible. In order to properly direct the motion of certain hand tools (especially those which are operated by way of power), the user must use the thumb to grip the tool and support its weight.

In addition to tenosynovitis, carpal tunnel syndrome can also develop. Carpal tunnel syndrome is a disorder caused by injury of the median nerve 90F where it passes through the carpal tunnel of the writs 90B. The symptoms include numbness, loss of feeling and grip, and finally muscle atrophy and loss of hand functions. This condition occurs three to ten times more often in women than in men, reflecting either a physiological-anatomical difference or only the fact that women are more likely to engage in work that requires repetitive bent-wrist matters.

A general practice in hand tool use is to avoid ulnar deviation 90L and radial deviation 90M as shown in FIG. 18. Radial deviation is another movement associated with hand tool use which can also lead to injury. This movement, particularly if combined with palmar flexion 90J and dorsiflexion, 90K increases pressure between the head of the radius and the capitulum of the humerus of the elbow. Avoidance of these damaging movements is accomplished by using tools which have a support attached, that acts as a plane to maintain a straight hand, wrist and forearm when the tool is in use. In addition to the hand, wrist and forearm support, handles should be designed with a slight upper-forward inclination that follows the natural angular inclination of the hand and a large contact surface. This will act to distribute over a larger area, the damaging effect which the weight of the tool imposes and to direct some stress to less-sensitive areas, such as the stronger tissue between the thumb and index finger.

Designing tools for safe operation in general would be a reason itself for attaching the pre-stated support that would substantially lower the occurrence of the damaging movements of the hand, wrist and forearm. By eliminating the need for the body to redirect support to areas that should not require it, the high-stress areas would receive the strength to function in an injury-free manner. The hand, 90 wrist 90B and forearm 90C could also gain strength because the support forces the maintaining of a straight-plane grip. The incentive design includes a drill housing that has the longitudinal axis of the attached drill bit in alignment with the longitudinal axis of the forearm and the fist grasping the handle of the housing. This longitudinally aligned design, in combination with the inventive hand, wrist and forearm support, avoids abnormal angular and rotational displacement between the hand and wrist and helps to minimize incidents of the above discussed problems. As described above, this eliminates the excessive stress induced from using tools while the wrist is bent and directs the necessary strength to the index finger, when a trigger action must be used.

A search of the prior art did not disclose any patents that read directly on the claims of the instant invention, however, the following U.S. Pat. Nos. were considered related:

| PATENT NO. | INVENTOR | ISSUED |
|---|---|---|
| Des. 326,597 | Lee | 2 June 1992 |
| 84105047.9 (EP) | Berry et al | (Pub) 0,127,014 |
| 2,525,588 | Cameron et al | 10 October 1950 |
| 712,843 | Paul | 4 November 1902 |

The Des. 326,597 Lee patent discloses a design for a power wrench. The wrench features an extended working arm having at its front end, a 360-degree rotating gripping section. The hand grip includes a power switch located at the front of the grip that is actuated by the fore finger. Extending from the loser back section of the hand grip, is a rod having at its back section an arm rest and an adjustable arm strap.

The 84105047.9 (EP) Berry et al patent discloses a hand grip for hand tools such as a power drill. The grip has a generally bulbs shape having an upper notch that allows the ball of the thumb to be placed therein. The grip also includes on its front section an upper groove and a lower edge that allows the three fingers of the hand to be comfortably wrapped around the grip. When the grip is grasped, the compressive forces produced by the hand are evenly distributed throughout the palm. This allows the hand tool to be maintained in a level configuration to provide maximum leverage and control.

The 2,525,588 Cameron et all patent discloses a portable hand drill. The drill features an electric bulb that is mounted in a passageway located in the front housing of the drill. The light bulb is mounted to direct light towards the drill point and the work area and includes a removable cap along with a focusing lens.

The 712,843 Paul patent discloses a pneumatic sugar-cane cutter. The cutter includes a rod that extends from the back of the cutting section. At the rear end of the rod is attached a curved or concave plate to which the forearm of the user is adapted or otherwise secured by a strap. The plate is pivotally attached to the rod so that, when the user releases the handle, the tool remains supported, permitting the operator free use of the hand.

In summary, the basic differences between the prior art patents and the applicant's invention is in the basic design of the housing which is longitudinally aligned with a hand, wrist and forearm support. In Lee's patent, the working forearm is in obvious misalignment with the hand grip, in Berry's et al patent, the compression forces produced by the hand are evenly distributed throughout the palm. However, the axis of the drill bit is in parallel with the axis of the forearm rotation and is not in alignment as in the applicant's design. In Cameron's et al patent, there is no parallel or direct alignment disclosed. The Paul's patent discloses a forearm and arm plate. However, the entire housing and plate design differs considerably from those of the applicant's invention.

For background purposes and as indicative of the art to which the invention is related, reference may be made to the remaining patents found in the search.

| PATENT NO. | INVENTOR | ISSUED |
|---|---|---|
| 5,361,851 | Fox | 8 November 1994 |
| 5,313,735 | Latouche | 24 May 1994 |
| 5,070,576 | Banta | 10 December 1991 |
| 4,924,571 | Albertson | 15 May 1990 |
| Des. 303,204 | Marks | 5 September 1989 |
| 4,779,687 | Schreiber et al | 25 October 1988 |
| 4,604,005 | Russ | 5 August 1986 |
| 2,138,348B (GB) | Andersson | 16 July 1986 |
| 56-56313 (JP) | Kishi | 18 May 1981 |
| 2,504,880 | Rittenhouse | 18 April 1950 |

DISCLOSURE OF THE INVENTION

The ergonomically designed, electrically energized hand drill features an extendable hand, wrist and forearm support that is disclosed in three design configuration. In each design configuration, when the support is extended and the hand drill is in use, the longitudinal axis of the hand, wrist and forearm are in substantial alignment with the longitudinal or neutral axis of the hand which is in substantial alignment with the longitudinal axis of a drill bit inserted into the drill chuck. In addition to the longitudinal alignment, the weight of the hand drill is optimally distributed to provide the user with maximum comfort and control. The ergonomic hand drill design, in combination with the hand, wrist and forearm support is intended to reduce incidents of repetitive use injuries and cumulative-effect traumas, such as carpal tunnel syndrome, tenosynovitis, trigger finger and tennis elbow as described in the background art section of this application.

For the sake of brevity, the invention is disclosed with reference to an electrically energized hand drill. However, the disclosed design is also applicable to other type of power hand tools such as saws, sanders, staplers, power drivers and the like.

In its basic form, the electrically energized hand drill includes a housing that encloses an electric motor, that preferably consists of a reversible d-c motor, that operates a drill chuck that extends from the front side of the housing. The power to the motor is provided by an electrical distribution circuit that is supplied power by a removable, battery power-pack that includes at least one rechargeable battery. Alternatively, a power input plug can be included on the side of the housing. The plug bypasses the internal power source and allows an external power source to be connected. The battery pack is slidably mounted to an upper handle support that extends outward from the rear side of the housing. Also extending from the rear side is a lower handle support, where between the two supports is located a forward-inclined handle. The handle has a substantially centered spring-loaded trigger switch that is connected to the electrical circuit. When the trigger switch is depressed, the electrical circuit applies the power from the battery power-pack to the drill motor which, in turn, causes the drill chuck to rotate.

As mentioned above, the hand, wrist and forearm support is disclosed and exemplified in three design configuration:

a) in the first design, the support can be retracted into the drill housing when not in use;
b) in the second design, the support is inserted into a support cavity when in use and is removed and stored when not in use; and
c) in the third design, the support is swivelly attached to allow the support to be extended when in use and nested and locked against the lower side of the drill housing when not in use.

In addition to the hand, wrist and forearm support the drill housing can also be manufactured to include:

a) a swivelling light assembly that is located on the upper, front side of the housing and that can be positioned to allow the light beam to focus on the end of the drill bit or work area;
b) a chuck key retaining cavity typically located on the back side of the housing;
c) a utility compartment for storing small drill bits and that includes a spring loaded, pivoted door;
d) a motor-reversing switch; and
e) at least one air vent.

In view of the above disclosure, it is the primary object of the invention to produce an ergonomically designed hand drill that includes a hand, wrist and forearm support that, when the hand drill is being operated, allows the hand, wrist and forearm to be aligned with the drill bit. In addition to the primary object of the invention, it is also an object to produce a hand drill or the like that:

is properly balanced to provide maximum comfort to the hand, wrist and forearm,
includes a drill housing handle having a firm front section with finger indentations and, a resilient back section that alleviates the hand drill motor trepidations, when the carpal tunnel area of the hand is exerting the required forward pressure,
eliminates or reduces health damaging effects when using a hand drill,
because of its ergonomic design, allows a more precise use of the hand drill,
can be designed to accommodate various sizes of drill chucks and drill motors,
is aesthetically designed,
requires little or no maintenance,
is reliable, and
is cost effective from both a manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
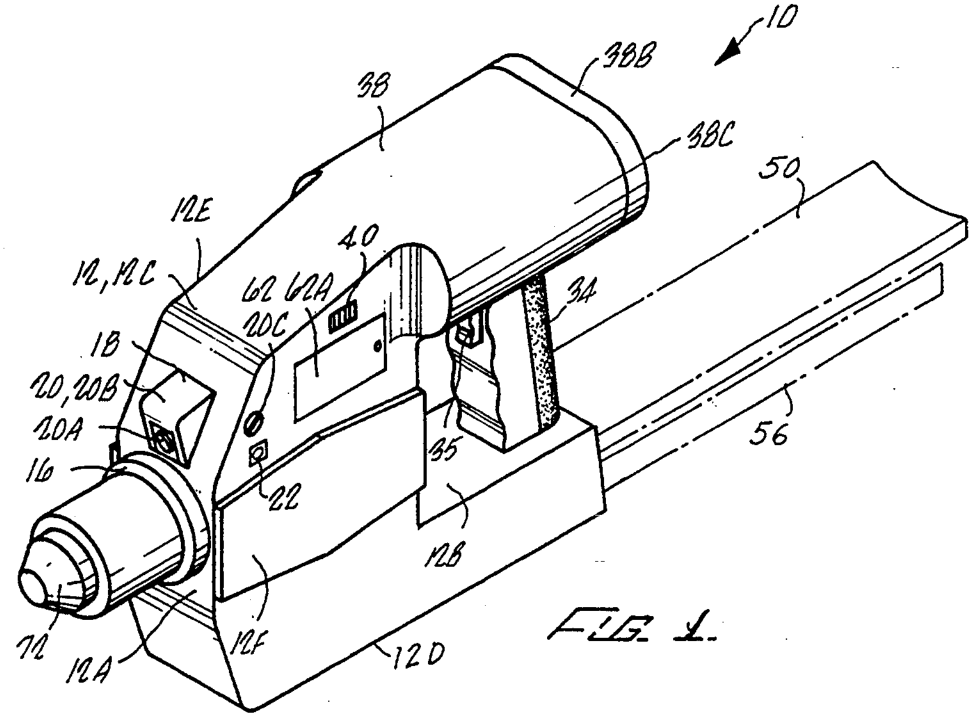
FIG. 1 is a perspective view of an electrically energized hand drill having a retractable hand, wrist and forearm support and a holder for spare drill bits.

The best mode for carrying out the invention is presented in terms of a preferred embodiment that includes a first, a second and a third design for a hand drill and a wrist and forearm support. The preferred embodiment as shown in FIGS. 1–16, is comprised of the following major elements: a drill housing 12, an electrical circuit 14, a swivelling light assembly 20, a light switch 22, a motor reversing switch 28, an upper handle support 30, a lower handle support 32, a handle 34, a power trigger switch 35, a battery power-pack 38, a hand, wrist and forearm support 50, and a slide-out drawer 56. The inventive elements are used in combination with an electric motor 70, a drill chuck 72, a drill chuck key 76, a battery 78, a drill bit 80 and a hand, wrist and forearm 90.

Figure 2:
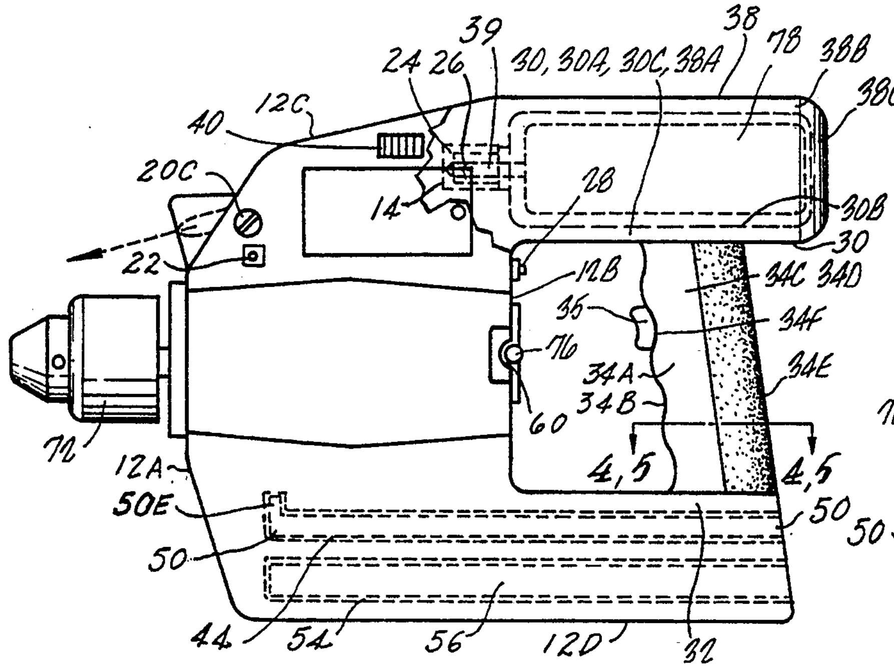
FIG. 2 is a side elevational view of the hand drill shown in FIG. 1.
Figure 4:
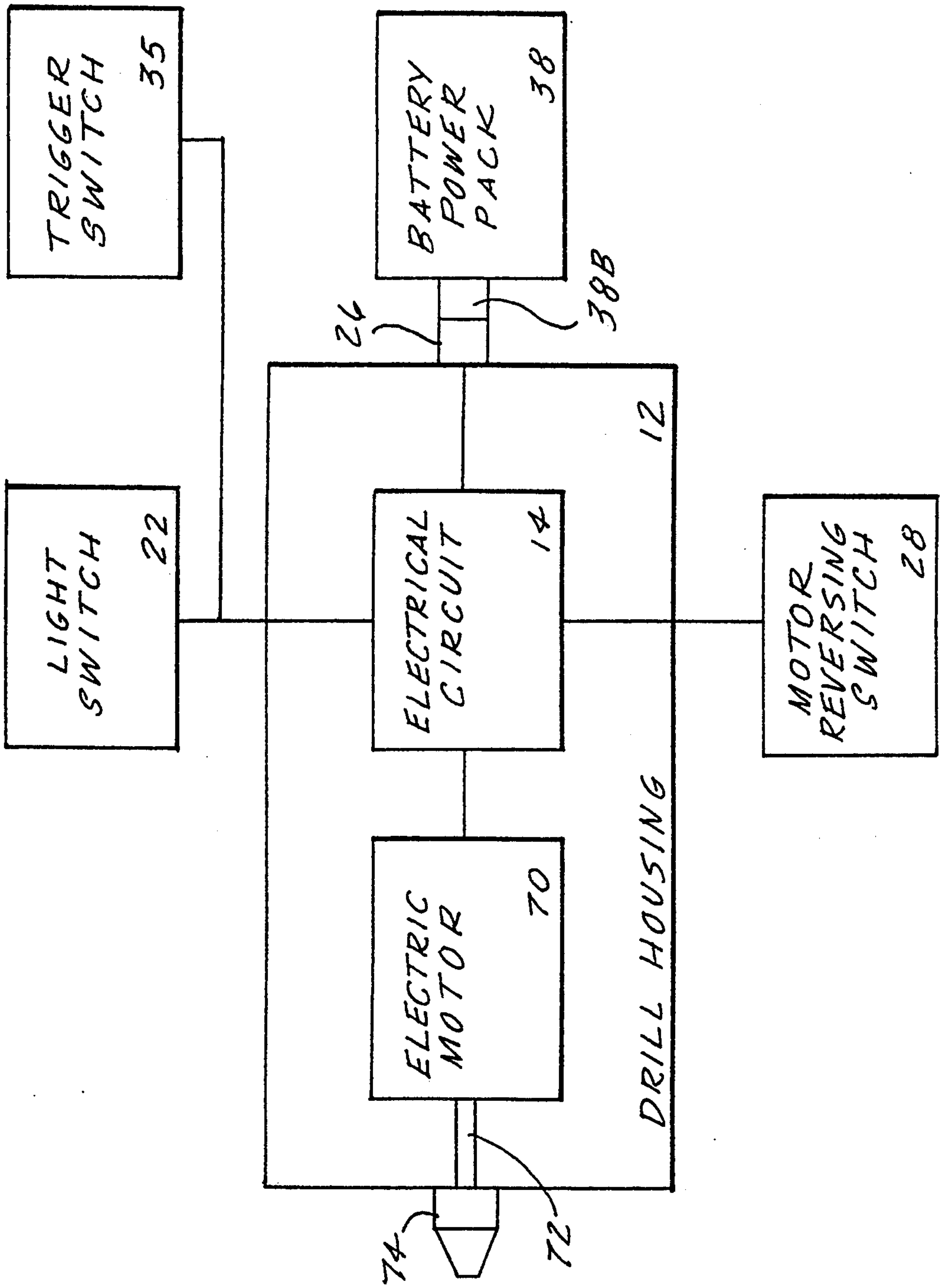
FIG. 4 is a block diagram of the electrical circuit located within the hand drill housing.
Figure 11:
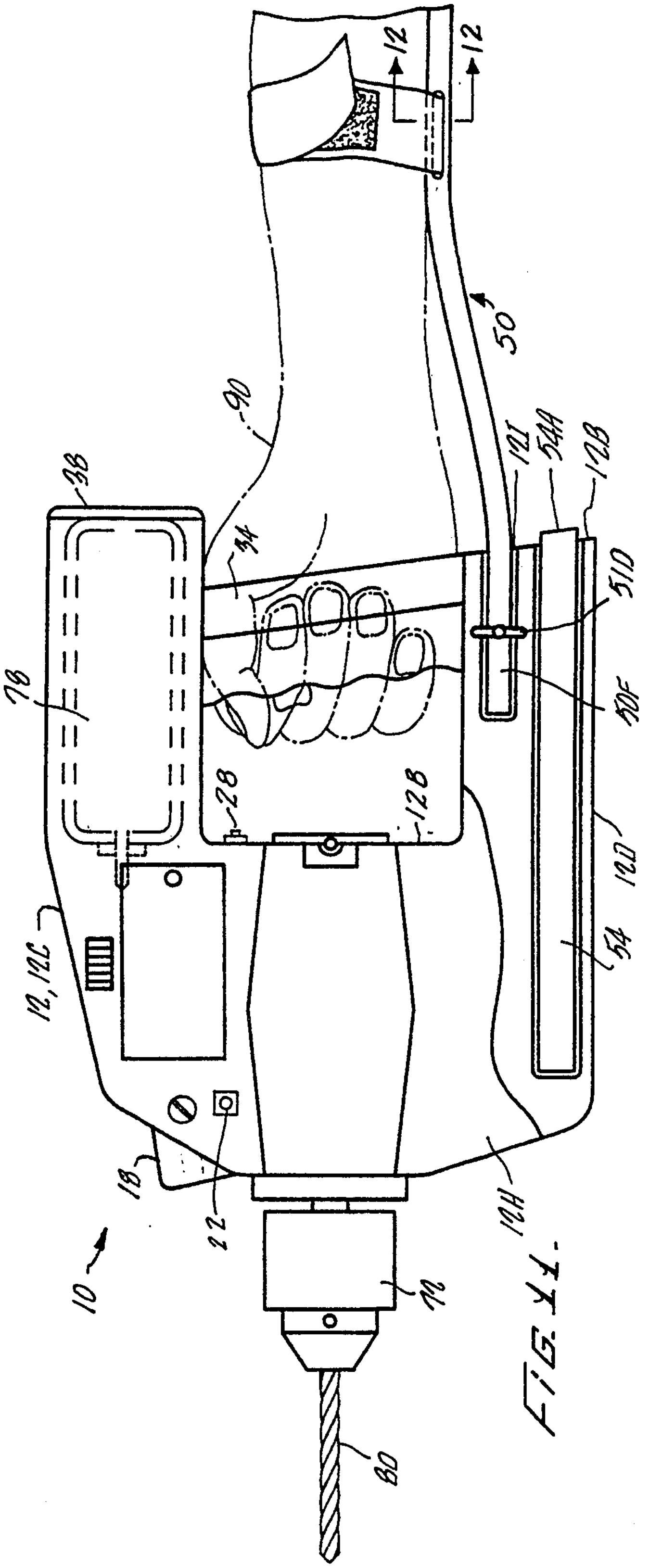
FIG. 11 is a side elevational view of a drill housing that incorporates a second design of a hand, wrist and forearm support which is removable when drill is not in use.
Figure 14:
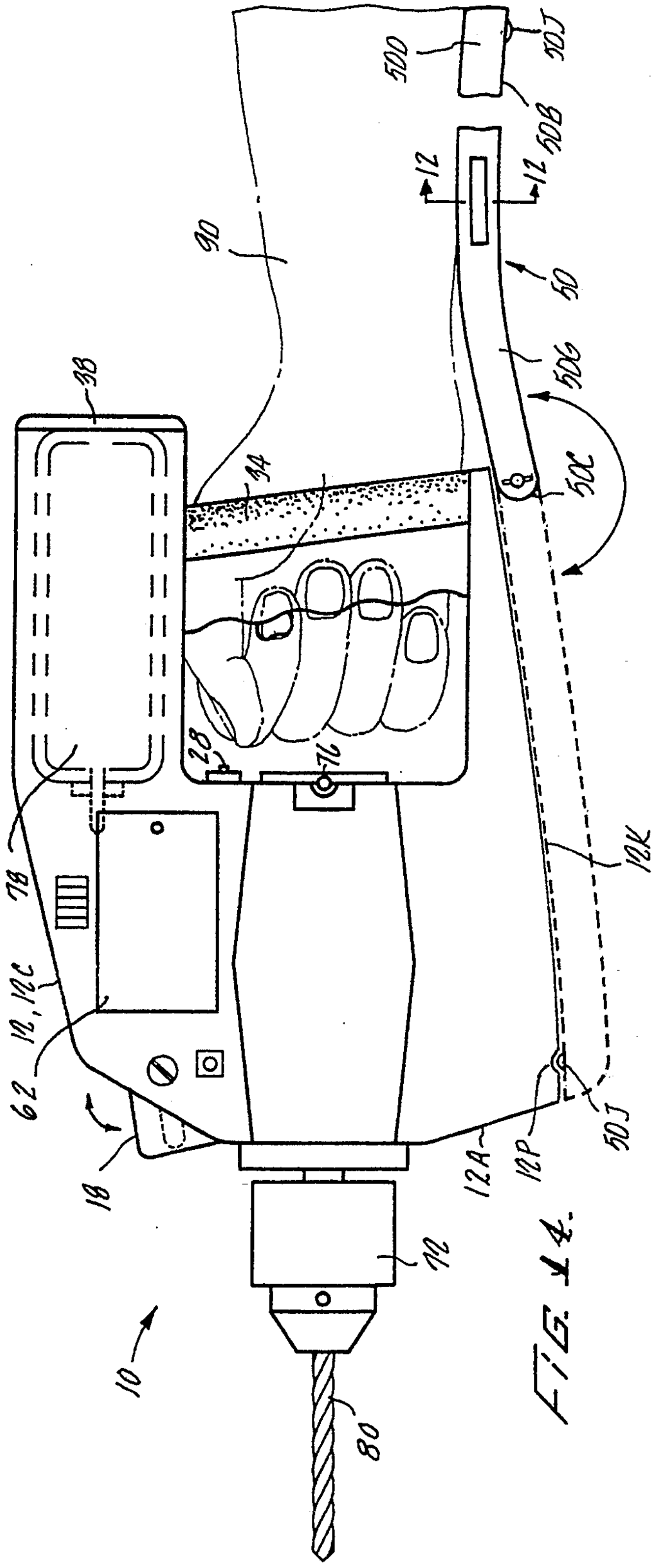
FIG. 14 is a side elevational view of a drill housing that incorporates a third design of a hand, wrist and forearm support that is shown in an extended position.

The drill housing which is preferably split into two longitudinal halves to facilitate manufacturing and assembly, may be constructed of a high impact plastic or a metal such as aluminum. As shown in FIGS. 1,2, 11 and 14, the drill housing 12 includes a front side 12A, a rear side 12B, an upper side 12C, a lower side 12D, a left side 12E, and a right side 12F. Within the drill housing 12, as shown in FIG. 4, is included the electrical circuit 14, and the electric motor 70 which includes a drive shaft that operates the drill chuck 72. The motor is preferably comprised of a reversible d-c motor that is controlled by the switch 35 and the motor reversing switch 28. The switch 28 is attached to the rear side 12B of the housing 12 as shown in FIGS. 2, 11 and 14, and is operated by the electrical circuit 14 as shown in the block diagram of FIG. 4.

The front side 12A of the housing has a drill chuck bore 16 therethrough into which is inserted the drill chuck 72 that attaches to the shaft of the electric motor 70. As also best shown in FIG. 1, through the front side 12A is located a light-assembly bore 18 that is placed above the drill-chuck bore 16. Into this bore 18 is inserted a swivelling light assembly 20, which includes a lamp 20A and a lamp guard 20B. The assembly 20 as best shown in FIG. 1, is swivelly attached thereto by an attachment means preferably consisting of a swivel pin and bolt combination 20C that is horizontally inserted through the back section of the lamp guard 20B. The pin and bolt 20C captively retain the swivelling light assembly and allow it to be tightened in a selected position. The power to the swivelling light assembly 20 is controlled by a light switch 22 as shown in FIGS. 1, 2 and 11, that is connected to the electrical circuit 14 as shown in FIG. 4.

Figure 3:
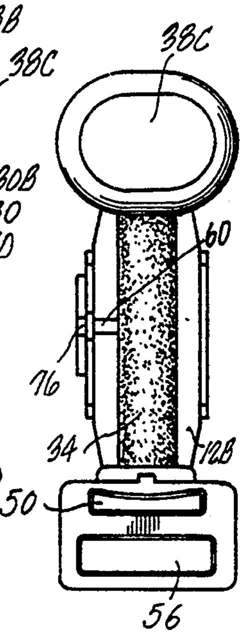
FIG. 3 is a rear elevational view of the hand drill shown in FIG. 1.

The rear side 12B as shown in FIGS. 2 and 3 includes a jack bore 24, a motor reversing switch 28, an upper and a lower handle support 30,32 and a handle 34 that includes a front section 34A. Preferably, the two handle supports 30,32 and the front section of the handle are integrally molded with the rear side 12B of the drill housing 12. The rear side also includes a chuck-key retaining cavity 60 as also shown in FIGS. 2 and 3 that retains the drill chuck key 76. The jack bore 24 as best shown in FIG. 2, is sized to receive and attach a power input jack 26 that is connected to the electrical circuit 14 as shown in FIG. 4. The motor reversing switch 28 is likewise connected to the electrical circuit 14.

Figure 5:
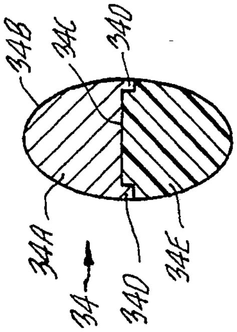
FIG. 5 is a sectional view of a first handle design taken along the lines 5—5 of FIG. 2.

The upper handle support 30 as shown in FIGS. 2 and 3, includes a wiring channel 30A that is located on the lower section of the support 30. On the upper surface of the support 30 is located a power-pack rail 30C. The back end of the upper handle support 30, as shown in FIG. 2, extends beyond the back surface of the handle 34 to allow it to function as an upper hand stabilizing and support surface. As shown best in FIG. 2, the handle 34 is slightly angled forward to compensate for the hands normal, angular displacement when the drill is being operated. The handle includes a front section 34A that has a finger contoured front surface 34B and a planar back surface 34C. The back surface is made with a lip 34D on each longitudinal end as shown in FIG. 5. Between the two lips 34D and the back surface 34 C, is attached by means of an adhesive, a resilient back section 34E as shown in FIGS. 2, 3 and 5.

Figure 6:
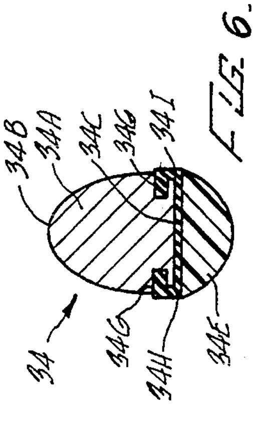
FIG. 6 is a sectional view of a second handle design taken along the lines 6—6 of FIG. 2.

Alternatively, as shown in FIGS, 6, the handle 34 includes a front section 34A having a front surface 34B a lower side edge and a planar back surface 34C. Along the lower side edge of the front section 34A and near the planar back surface 34C, as shown in FIG. 6, is located a longitudinally extending cavity 34G. To the inward surface of the resilient back section 34E is attached by an attachment means, a combination metal support and spring 34H having on each end a tap 34I that is sized to fit into the respective cavity 34G. This handle design allows the resilient back section 34E to be easily removed and replaced when worn or when a back section of different firmness is desired. In either design, the front section 34A includes therethrough a slot 34F into which is inserted and attached the spring-loaded power trigger switch 35. As shown best in FIG. 2, the trigger switch 35 is elongated and is located near the center of the hand 34 so that the switch can be easily depressed by the middle finger. The switch 35 is connected to by the electrical circuit 14 through a set of electrical wires (not shown) that are routed through the wiring channel 30A on the upper handle support 30.

The battery power-pack housing 38 as best shown in FIG. 2, encloses at least one rechargeable power pack 78, that preferably consists of a nickel-cadmium battery, and has attached to a back opening 38B, a moisture resistant cap 38C. On the bottom of the housing 38 is located a lower channel 38A that is sized to slide into the power-pack rail 30C on the upper handle support 30. The front of the power pack 78 has a male power jack 39 that is sized to fit into and be attached to the power input jack 26 that is inserted into the jack bore 24 which in turn, is connected to the electrical circuit 14 as shown in FIG. 4. When the jack 39 is inserted, the battery power-pack 78 is positioned to supply power to the electrical circuit. Thus, when the spring-loaded trigger switch 35 is depressed, power is applied which then causes the electric motor 70 and drill chuck 72 to rotate.

The battery-pack housing 38, as shown on all the applicable figures, is preferably located on the upper side 12C of the drill housing 12. However, the drill housing can also be designed to allow the battery-pack housing to be located on the lower side 12D.

The left side 12E and/or the right side 12F of the housing 12, have at least one air vent 40 to help dissipate the heat build-up within the housing 12. These same sides may also include a flush mounted utility compartment 62 that includes a spring-loaded pivoted door 62A as shown in FIG. 1. This utility compartment can be used to house and protect a plurality of small drill bits.

The ergonomic design of the drill 10, features the hand, wrist and forearm support 50 which is particularly adapted to be used when drilling a material that is perpendicular to the hand, wrist and forearm. The first support design described, is retractable and is shown retracted in FIG. 7 and extended in FIG. 9. When extended, the longitudinal axis of the hand, wrist and forearm 90, as shown in FIG. 11, are in substantial alignment with the longitudinal or neutral axis of the hand which in turn, is in substantial alignment with the drill bit 80 inserted into the drill chuck 72. This alignment aids in preventing or at least minimizing occurrences of the ailments discussed in the BACKGROUND ART section.

Figure 7:
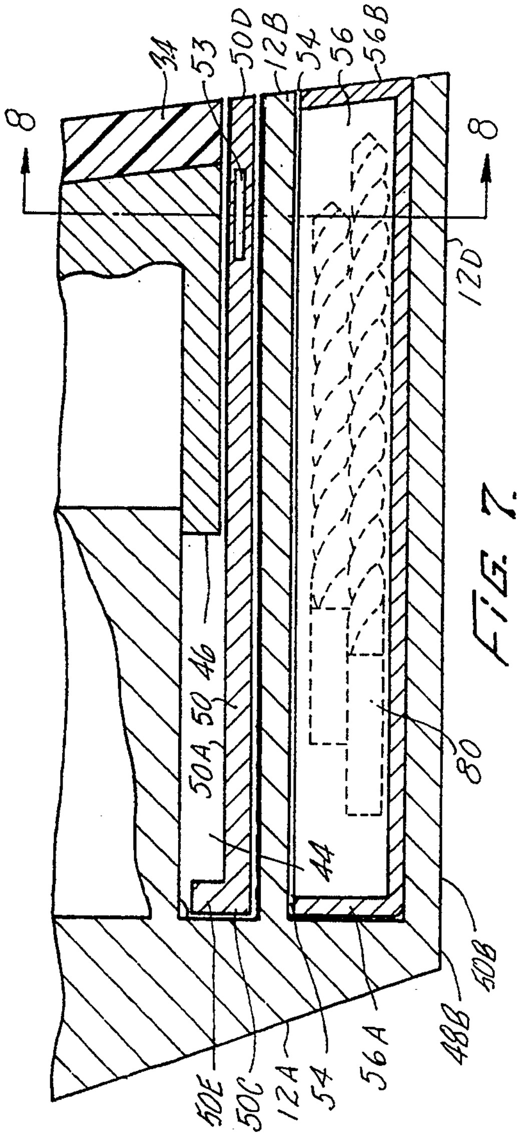
FIG. 7 is a partial, side-elevational and sectional view of the retractable hand, wrist and forearm support, which includes a holder for spare drill bits shown in the retracted position.
Figure 9:
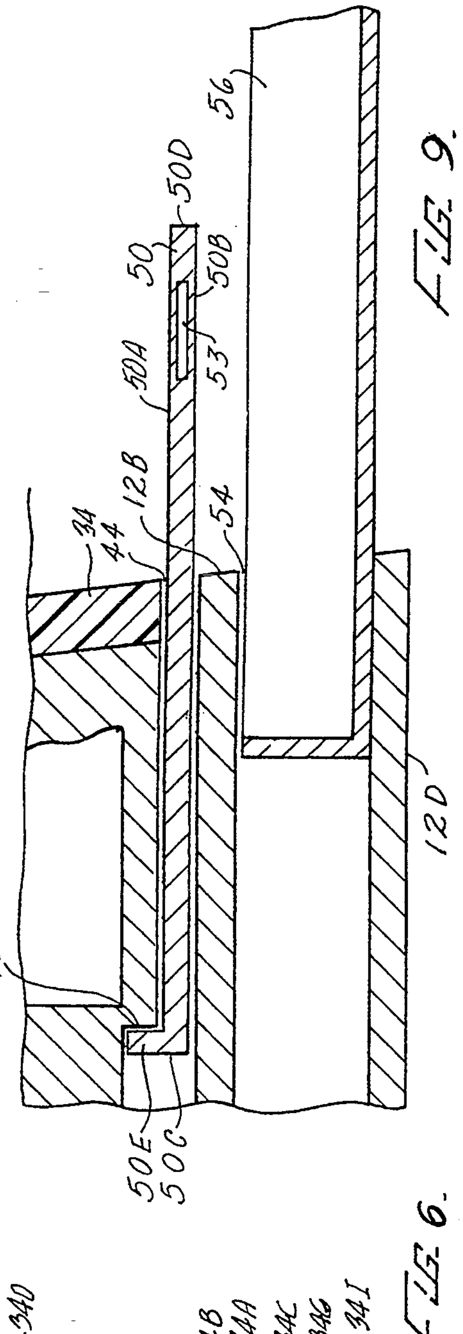
FIG. 9 is a partial, side-elevational and sectional view of the retractable hand, wrist and forearm support and the retractable holder for spare drill bits shown in the extended, functional position.
Figure 12:
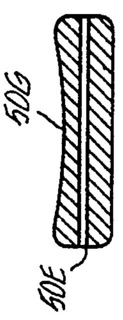
FIG. 12 is a sectional view of the second and third hand, wrist and forearm supports taken along the lines 12—12 of FIGS. 11 and 14.

The first design of the hand, wrist and forearm support 50 as shown in FIGS. 1, 7 and 9 includes an upper surface 50A, a lower surface 50B, a front end 50C and a back end 50D. Extending upward from the front end 50C is located an upward extending protrusion 50E that is sized to slidably fit into a longitudinal support cavity 44. The cavity has near its center, a support store 46 that interfaces with the protrusion 50E and retains the support 50 within the cavity 44 when the support is extended as shown in FIGS. 1 and 9. When the support is retracted, the back end 50D is flush with the rear side 12B of the drill housing 12. The support 50 as shown in FIG. 12, has a concave surface 50G and near the back end 50D, as shown in FIGS. 7 and 9, is a transverse slot 53 into which may be inserted an adjustable forearm strap 66 (not shown). The strap which further supports the forearm is adjustably attached around the forearm by an attachment means such as a hook and loop fastener 68 sold under the trademark VELCRO.

Figure 8:
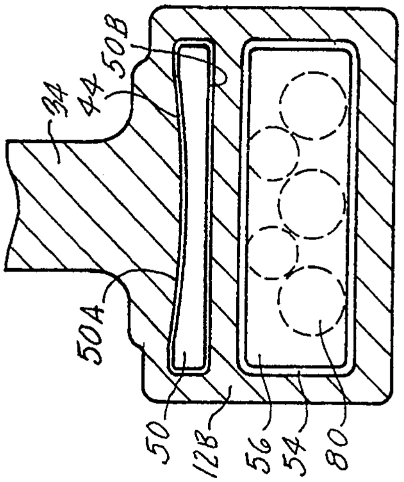
FIG. 8 is a sectional view of the hand, wrist and forearm support taken along the lines 8—8 of FIG. 7.

Located below the support cavity 44 and above the lower side 12D of the drill housing 12, is located a longitudinal drawer cavity 54 that is sized to accept a slide-out drawer 56 having a front side 56A and a rear side 56B. When the drawer 56 is fully inserted, its rear side 56B is also flush with the rear side 12B of the drill housing 12. The drawer is typically used to hold a plurality of drill bits 80 as shown in FIGS. 7 and 8.

Figure 10:
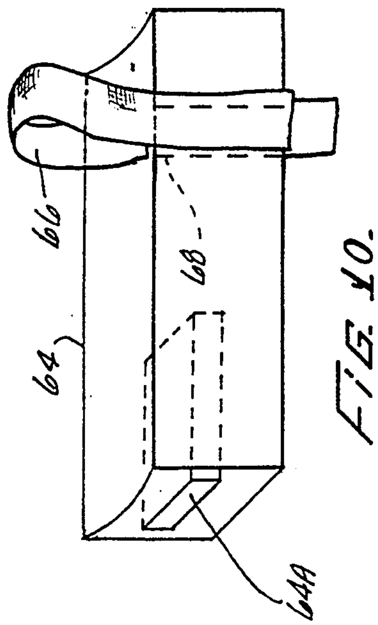
FIG. 10 is a perspective view of a contoured forearm support extension that is used to extend the longitudinal distance of the retractable hand, wrist and forward support and that includes a VELCRO attached forearm strap.

The retractable hand, wrist and forearm support 50 is of sufficient length to provide the proper support. However, in some situations, it may be desirable to extend the longitudinal length of the support to provide further support to the forearm. To achieve this extension, a forearm support extension 64 as shown in FIG. 10 can be employed. The extension 64 has an upper surface that is contoured to provide further ergonomic support and includes a cavity 64A that is sized to accept the back end 50D of the support 50. To further enhance the utility of the extension 64 an adjustable forearm strap 66 that further supports the forearm is adjustably attached by an attachment means such as a hook and loop fastener 68 as also shown in FIG. 10.

Figure 13:
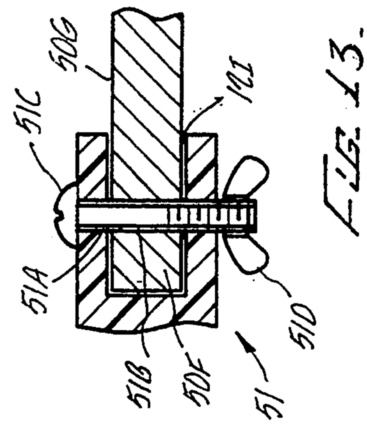
FIG. 13 is a top sectional view showing the second design of the hand, wrist and forearm support inserted into a support cavity and secured thereto.

The second design for the hand, wrist and forearm support 50 is shown in FIGS. 11, 12 and 13. In this design, the drill housing 12 has a lower section 12H that further has a rear side 12B. From the rear side extends inward a support cavity 12I.

The ergonomically contoured hand, wrist and forearm support 50 has a front section 50F that is sized to be slidably inserted into the support cavity 12I as shown in FIGS. 11 and 13. The contour 50G of the support as also shown in FIGS. 11 and 12, allows the hand, wrist and forearm to be supported with the longitudinal axis of the hand, wrist and forearm 90 in substantial alignment with the longitudinal axis of the drill bit 80 inserted into the drill chuck 72.

The hand, wrist and forearm support 50 is secured to the support cavity 12I by a support means 51. This means preferably consists of a lateral bolt bore 51A that is substantially centered and in alignment with the support cavity 12I. The support 50 also has a lateral bolt bore 51B therethrough. This bolt bore is in alignment with the bolt bore 51A when the support 50 is fully inserted into the support cavity 12I. To secure the two elements together, a threaded bolt 51C is inserted into the two bores 51A, 51B and a winged nut 51D is tightened to secure the support to the drill housing 12. When the support is inserted into the support cavity 12I, the hand, wrist and forearm are supported in a normal working configuration as described supra.

To further increase the utility of the above support 50, it can be made of a metal. When this metal support is heated, it can be shaped to fit the hand, wrist and forearm contour of a specific hand drill user.

Figure 15:
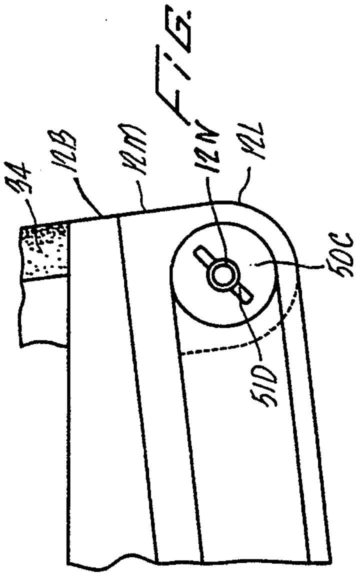
FIG. 15 is a partial elevational view of the third hand, wrist and forearm support design shown in the retracted position.
Figure 16:
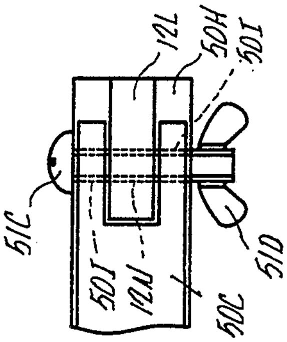
FIG. 16 is a top plan view showing the third hand, wrist and forearm support design having a bifurcated section that is swivelly attached to a downward extending section attached to the hand drill housing.
Figure 17:
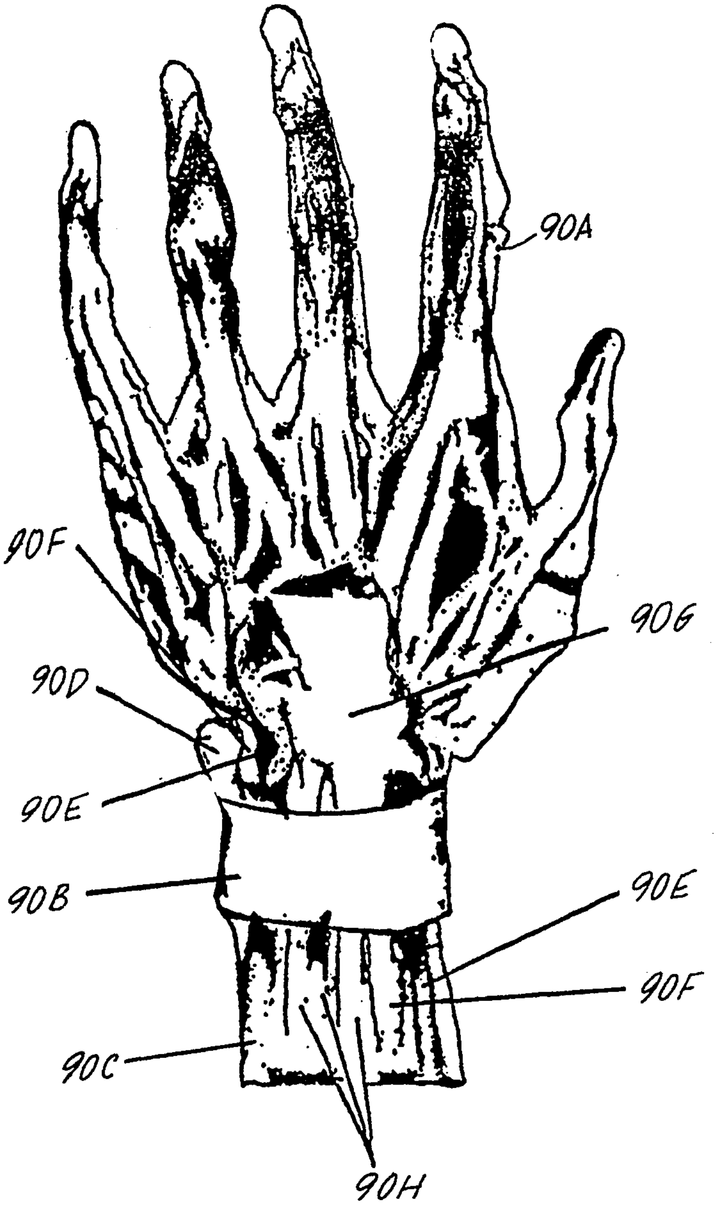
FIG. 17 is an anatomical plan view of the hand showing the nerves, bones, arteries, and ligaments that are affected during the use of a hand drill.
Figure 18:
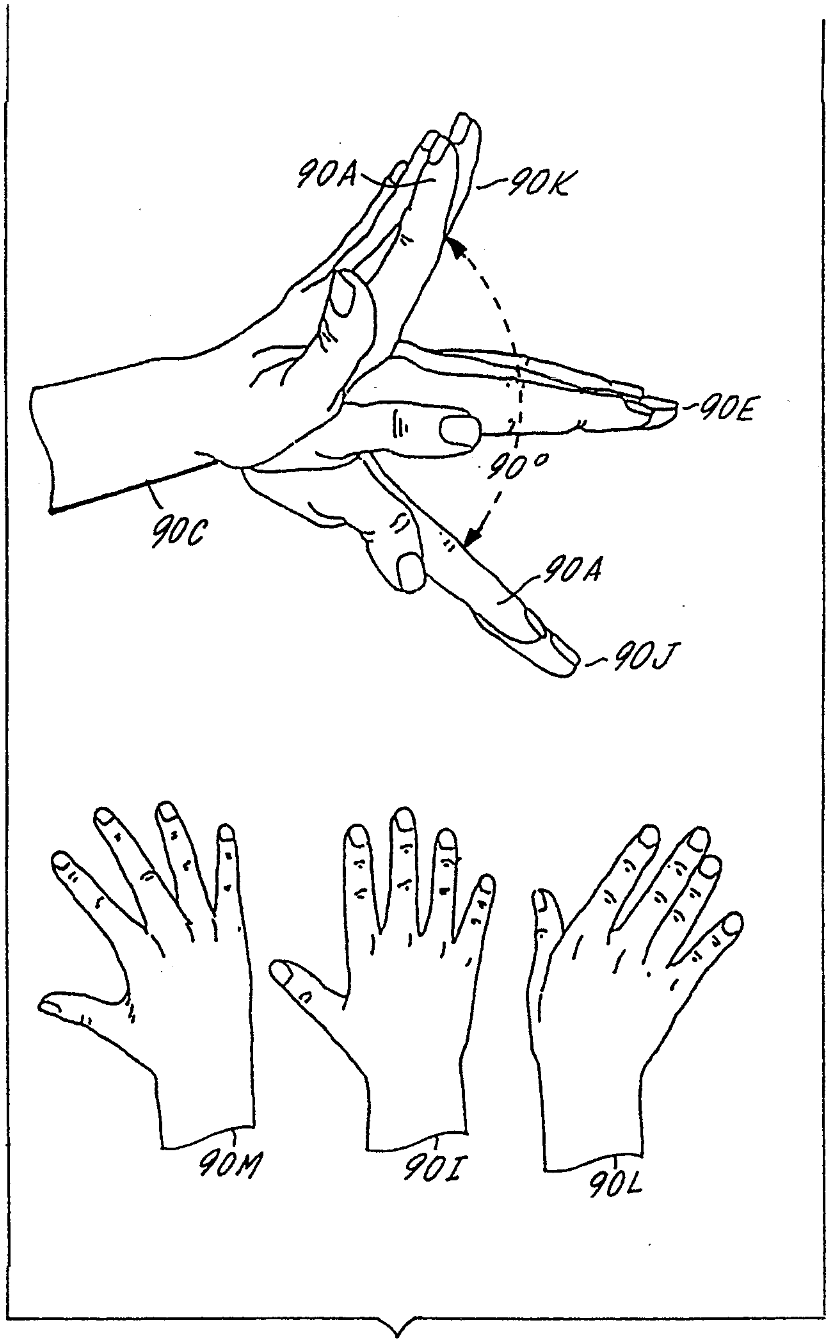
FIG. 18 is an illustration showing the movements of the wrist joint about two axes.

The third design for the hand, wrist and forearm support 50 is shown in FIGS. 14, 15 and 16. In this design, the drill housing 12 has a contoured lower surface 12K as shown in FIG. 14. Integral with the lower surface as shown in FIG. 15 is a downward extending section 12L having a back surface 12M that is substantially on the same plane as the rear side 12B of drill housing 12. Through the center of the section 12L is located therethrough a bolt bore 12N.

The ergonomically contoured hand, wrist and forearm support 50 in this third design, has a back end 50D and a front end 50C that is configured as a bifurcated section 50H that has therethrough a bolt bore 50I as shown in FIG. 16. The section 50H is sized to slidably fit into the downward extending section 12L on the drill housing as shown best in FIG. 16. When so inserted, the two bolt bores 12N, 50I are in alignment as also shown in FIG. 16.

To swivelly secure the bifurcated section 50H to the downward extending section 12L, a threaded bolt 51C is inserted into the two bores 12N, 50I and a winged nut 51D is tightened to secure the support to the drill housing 12. The support 50 can either be placed in an outward functional position as shown in FIG. 14 or rotated inwardly, about the bolt 51C, and secured against the contoured lower surface 12K of the drill housing 12 as shown by the broken lines in FIG. 14. To secure the support 50, the drill housing 12 has on the contoured lower surface 12K near the front side 12A, a female detent 12P. A complimentary male detent 50J is located on the lower surface 50B near the back end 50D. When the support 50 pivots inward about the bolt 51C on the lower extending section 12M, the male detent 50J interfaces with the female detent 12P to secure the support to the drill housing as shown in FIG. 14. When the support is placed in the extended functional position, the hand, wrist and forearm 90 of the hand drill user are supported as described in the two previous designs.

While the invention has been described in complete detail and pictorially shown in the accompanying drawings it is not to be limited to such details, since many changes and modifications may be made in the invention without departing form the spirit and scope thereof. For example, the basic design of the invention is also applicable for use with power staplers, power drivers power screwdrivers, impact wrenches, blend rivet tools, pneumatic hammers, air drills, adjustable clutch/torque screwdrivers and other like power hand tools. Hence, it is described to cover any and all modifications and forms which may come within the language and scope of the appended claims.

I claim:

1. An ergonomically designed, electrically energized hand drill comprising:

a) a drill housing having a front side, a rear side, and a lower side, where said housing encloses an electric motor that is activated by an enclosed electric circuit, and where from the rear side of said housing extends a handle that when gripped by a user's hand, the longitudinal axis of the hand is in substantial alignment with the longitudinal axis of a drill bit inserted into a drill chuck protruding from the front side of said housing and that is activated by said electric motor, and b) a hand, wrist ad forearm support means, that is extendable from the rear side of said drill housing, where when said support is extended, the wrist and forearm are in substantial alignment with the longitudinal axes of the hand and the drill bit while said hand drill is being used.

2. The hand drill as specified in claim 1 wherein said handle is forwardly tilted and is supported by an upper and a lower handle support, where said handle includes a front surface, a back surface and a lower end.

3. The hand drill as specified in claim 2 wherein said handle is further comprised of:

a) a front section having a front surface with lower side edges and a planar back surface, with the lower side edges having near the planar back surface, a longitudinally extending cavity, and b) a resilient back section having an inward surface to which is attached by an attachment means, a combination metal support and spring, with said support and spring having on each end a tab that is sized to fit into the respective cavity on the front section, to thus secure the back section to the front section.

4. The hand drill as specified in claim 2 wherein said handle is further comprised of:

a) a front section having a front surface and a planar back surface having a lip on each longitudinal end, and b) a resilient back section shaped to fit and be attached by an adhesive to the planar back surface of said handles's front section.

5. The hand drill as specified in claim 1 wherein said housing further comprises:

a) said rear side having a jack bore into which is inserted and attached a power input jack that is connected to said electrical circuit, and b) a battery power pack that is supported by the upper handle support on said housing and having a male power jack that is sized to fit into and be attached to said power input jack, where when a spring-loaded trigger switch attached to said handle and operating said electric circuit is depressed, the drill chuck attached to said electric motor rotates.

6. The hand drill as specified in claim 5 wherein said battery power-pack is powered by at least one rechargeable battery.

7. The hand drill as specified in claim 6 wherein said battery power pack further comprises a back opening that has attached a moisture resistant cap.

8. The hand drill as specified in claim 7 wherein the back end of the upper handle support extends beyond the back surface of said handle to function as an upper hand stabilizing surface.

9. The hand drill as specified in claim 5 wherein said electric motor is comprised of a reversible d-c motor that is controlled by a motor reversing switch attached to said housing and that is operated by said electrical circuit.

10. The hand drill as specified in claim 5 wherein the front side of said housing further having a light assembly bore into which is swivelly attached by an attachment means, a swivel light assembly that is controlled by a light switch attached to said housing and that is connected to and operated by said electric circuit.

11. The hand drill as specified in claim 10 wherein said means for swivelly attaching said swivelling light assembly comprises a combination swivel pin and bolt horizontally inserted through the back section of the lamp guard, where said pin and bolt captively retains said swivelling light assembly in vertical alignment and when the combination pin and bolt are tightened, said swivelling light assembly is located in a selected position.

12. The hand drill as specified in claim 2 further comprising a chuck key retaining cavity that is located on the rear side of said drill housing.

13. The hand drill as specified in claim 2 wherein either the left or right sides of said housing further comprise a utility compartment having a spring loaded pivoted door.

14. The hand drill as specified in claim 1 wherein said hand, writs and forearm support means comprises:

a) said housing having:

(1) a longitudinal support cavity that extends from the back surface of said drill housing and having near its center, a support stop, (2) a longitudinal drawer cavity that extends from the back surface of said drill housing and that is located below the support cavity and above the lower side of the drill housing, b) a retractable hand, wrist and forearm support having an upper surface, a lower surface, a front end and a back end, where from the front end is located an upward extending protrusion that is sized to slidably fit into the support cavity, where the protrusion interfaces with the support store to retain said support within the support cavity when said support is placed in an extended position, where when said support is retracted into the support cavity, the back end of said support is flush with the rear side of said drill housing, and c) a slide-out drawer having a front side, a rear side, and that is sized to be inserted into the longitudinal drawer cavity, where when said drawer is fully inserted, the rear side of said drawer is flush with the rear side of said drill housing.

15. The hand drill as specified in claim 14 wherein said retractable hand, wrist and forearm support further comprises a transverse slot into which may be inserted an adjustable forearm strap that further supports the user's forearm when said drill in use.

16. The hand drill as specified in claim 15 wherein said retractable hand, wrist and forearm support further comprises a forearm support extension having a cavity that is sized to accept the back end of said support, where when inserted, the longitudinal length of said support is increased to provide further ergonomic support to a user's forearm.

17. The hand drill as specified in claim 1 wherein said hand, wrist and forearm support means comprises:

a) said drill housing having a lower section further having a rear side from where extends inward a support cavity, and b) an ergonomically contoured hand, wrist and forearm support, said support having a front section sized to be slidably inserted into the support cavity and secured thereto by a support securing means, where the contour of said support allows the wrist and forearm to be supported in substantial alignment with the longitudinal axis of the hand, which is further in substantial alignment with the longitudinal axis of the drill bit inserted into the drill chuck.

18. The hand drill as specified in claim 17 wherein said means for securing said support to said support cavity comprises:

a) said drill housing lower section having a lateral bolt bore therethrough that is substantially centered and in alignment with said support cavity, b) said support having a lateral bolt bore therethrough that is in alignment with the bolt bore on said lower section when said support is fully inserted into said support cavity, and c) a combination threaded bolt and winged nut where when said bolt is inserted through the bolt bores and the winged nut is tightened said support is secured to said housing.

19. The hand drill as specified in claim 18 wherein said support is made of a metal that when heated can be shaped to fit the hand, wrist and forearm contour of a specific said hand drill user.

20. The hand drill as specified in claim 18 wherein said drill housing further comprises near the lower side, a longitudinal cavity having a spring loaded cap, where said cavity is sized to allow the storage of drill bits and like.

21. The hand drill as specified in claim 1 wherein said wrist and forearm support means comprises:

a) said drill housing having a contoured lower surface that further includes a downward extending section having a back surface that is substantially on the same plane as the rear side of said drill housing, with said extending section having a bolt bore therethrough, b) an ergonomically contoured wrist and forearm support comprising:

(1) a front end and a back end with the front end configured as a bifurcated section that is sized to slidably fit into the downward extending section on said drill housing and with the bifurcated section having a bolt bore therethrough that is aligned with the bolt bore on the downward extending section when the bifurcated section is inserted into the downward extending section, (2) a combination threaded bolt and wing nut, where when said bolt is inserted through the bolt bores and the winged nut is tightened, the support can be placed in an outward functional position or rotated inward about said bolt and secured against the contoured lower side of said drill housing, where when placed and tightened in the functional position, the wrist and forearm are supported in substantial alignment with the longitudinal axis of the hand, which is further in substantial alignment with the longitudinal axis of the drill bit inserted into the drill chuck.

22. The hand drill as specified in claim 21 further comprising:

a) said drill housing having on the contoured lower surface near the front side a female detent, and b) said support having on the lower surface near the front end a male detent, where when said support pivots inward, about the bolt on the lower extending section, the male detect interfaces with the female detent to secure said support to said drill housing.

* * * * *